(12) United States Patent
Ohshima et al.

(10) Patent No.: US 11,149,161 B2
(45) Date of Patent: Oct. 19, 2021

(54) METAL INK

(71) Applicant: TANAKA KIKINZOKU KOGYO K.K., Tokyo (JP)

(72) Inventors: Yuusuke Ohshima, Tsukuba (JP); Yuichi Makita, Tsukuba (JP); Teruhisa Iwai, Tsukuba (JP); Hitoshi Kubo, Tsukuba (JP); Shigeki Yamanaka, Hiratsuka (JP); Masahiro Ito, Hiratsuka (JP); Shingo Watanabe, Hiratsuka (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 51 days.

(21) Appl. No.: 16/618,095

(22) PCT Filed: Aug. 1, 2018

(86) PCT No.: PCT/JP2018/028771
§ 371 (c)(1),
(2) Date: Nov. 27, 2019

(87) PCT Pub. No.: WO2019/031323
PCT Pub. Date: Feb. 14, 2019

(65) Prior Publication Data
US 2020/0140710 A1    May 7, 2020

(30) Foreign Application Priority Data
Aug. 8, 2017 (JP) .............................. JP2017-153660

(51) Int. Cl.
*C09D 11/52* (2014.01)
*C09D 11/037* (2014.01)
*H01B 1/22* (2006.01)

(52) U.S. Cl.
CPC ............ *C09D 11/52* (2013.01); *C09D 11/037* (2013.01); *H01B 1/22* (2013.01)

(58) Field of Classification Search
CPC ...... C09D 11/033; C09D 11/037; C09D 11/06; C09D 11/52; H01B 1/00; H01B 1/22
See application file for complete search history.

(56) References Cited

U.S. PATENT DOCUMENTS

2005/0285084 A1* 12/2005 Fujii ................... H01B 1/22
252/500
2008/0207934 A1* 8/2008 Kim ................... B82Y 30/00
554/74

(Continued)

FOREIGN PATENT DOCUMENTS

| JP | H03-67402 A | 3/1991 |
| JP | H10-312712 A | 11/1998 |

(Continued)

OTHER PUBLICATIONS

International Searching Authority, "International Search Report," issued in connection with International Patent Application No. PCT/JP2018/028771, dated Oct. 2, 2018.

(Continued)

*Primary Examiner* — Mark Kopec
*Assistant Examiner* — Jaison P Thomas
(74) *Attorney, Agent, or Firm* — Foley & Lardner LLP

(57) ABSTRACT

A metal ink containing metal particles including silver, a protective agent A including an amine compound, and a protective agent B including a fatty acid. The metal ink is configured such that the protective agent A includes at least one $C_{4-12}$ amine compound, and the protective agent B includes at least one $C_{22-26}$ fatty acid. It is preferable that the amine compound content is 0.2 mmol/g or more and 1.5 mmol/g or less on a silver particle mass basis. In addition, it is preferable that the fatty acid content is 0.01 mmol/g or more and 0.06 mmol/g or less on a silver particle mass basis.

16 Claims, 3 Drawing Sheets

PRESENT EMBODIMENT (ERUCIC ACID PROTECTION)

COMPARATIVE EXAMPLE (OLEIC ACID PROTECTION)

(56) References Cited

U.S. PATENT DOCUMENTS

| | | | |
|---|---|---|---|
| 2015/0231698 A1 | 8/2015 | Kurihara et al. | |
| 2015/0245480 A1* | 8/2015 | Kubo | H05K 3/1291 |
| | | | 428/338 |
| 2017/0256332 A1 | 9/2017 | Miyazaki et al. | |

FOREIGN PATENT DOCUMENTS

| | | |
|---|---|---|
| JP | 2001-207088 A | 7/2001 |
| JP | 2006-037071 A | 2/2006 |
| JP | 2014-040630 A | 3/2014 |
| JP | 2014-091849 A | 5/2014 |
| JP | 2016-048601 A | 4/2016 |

OTHER PUBLICATIONS

International Searching Authority, "Written Opinion," issued in connection with International Patent Application No. PCT/JP2018/028771, dated Oct. 2, 2018.

\* cited by examiner

1 DAY AFTER PRODUCTION

20 DAYS AFTER PRODUCTION

1 DAY AFTER PRODUCTION

↓

20 DAYS AFTER PRODUCTION

PRESENT EMBODIMENT (ERUCIC ACID PROTECTION)

COMPARATIVE EXAMPLE (OLEIC ACID PROTECTION)

METAL INK

RELATED APPLICATIONS

The present application claims priority under 37 U.S.C. § 371 to International Patent Application No. PCT/JP2018/028771, filed Aug. 1, 2018, which claims priority to and the benefit of Japanese Patent Application No. 2017-153660, filed on Aug. 8, 2017. The contents of these applications are hereby incorporated by reference in their entireties.

TECHNICAL FIELD

The present invention relates to a metal ink having silver particles dispersed in a solvent. It particularly relates to a metal ink which contains a fatty acid in a specific range as an indispensable protective agent and is capable of exerting stable printability.

BACKGROUND ART

For the formation of electrodes/lines on circuit boards of various electronic devices or on transparent substrates of touch panels and displays, use of a metal ink has been attracting attention. Such a metal ink has fine particles of an electrically conductive metal dispersed in a solvent, and its application enables the formation of electrodes/lines in a desired shape/pattern. This process is advantageous in that, as compared with a conventional thin-film formation process such as sputtering, a vacuum atmosphere is not required, and the device cost can also be reduced.

An example of such a metal ink is the metal ink containing silver particles (silver ink) described in Patent Document 1. Silver particles applied to this metal ink can be obtained by allowing a silver compound to react with an amine to form a silver-amine complex and thermally decomposing the same. Silver particles produced by this method are in the state of being protected (covered) with an amine, and are fine and have a uniform particle size. A metal ink containing such silver particles can form an electrode/line through the sintering of silver particles at a relatively low temperature. A metal ink having low-temperature sinterability can expand substrate options. In addition to metal/glass substrates, electrodes/lines can be suitably formed also on resin substrates, such as plastics and PET, and organic material substrates, such as polyimide.

In addition, the present applicant has found a method in which while a metal ink containing silver particles derived from a silver-amine complex as above is used, the substrate is subjected to a predetermined treatment, whereby a high-precision metal line heretofore unattainable is formed by printing (Patent Document 2). In this method, first, a liquid-repellant fluorine-containing resin layer is formed on a substrate, and a functional group is formed in a region of the substrate surface where a line pattern is to be formed. Then, a metal ink is applied to the substrate, and metal particles in the ink are joined to the functional group, followed by sintering, thereby forming a metal line. In this method, a functional group is formed by irradiation with light such as UV light to allow for fine patterning, and a metal ink is applied thereto, whereby efficient and high-precision line formation is achieved.

Here, in order to prevent metal particles from aggregating and coarsening in a metal ink, a protective agent is generally added to a metal ink. Also, in the above Patent Document 1, the amine that covers silver particles in the course of silver particle production is contained as a protective agent in the metal ink. In addition, in the above Patent Document 2, in addition to an amine compound, a fatty acid is contained as a protective agent in the metal ink.

RELATED ART DOCUMENT

Patent Documents

Patent Document 1: JP 2014-40630 A
Patent Document 2: JP 2016-48601 A

SUMMARY OF THE INVENTION

Problems to be Solved by the Invention

The conventional metal ink described above enables the stable formation of electrodes/lines because of fine metal particles that exert low-temperature sinterability and their protective agent. However, according to the study by the present inventors, it has been confirmed that even for a metal ink that has been satisfactory in earlier use, it is currently difficult to completely meet the recent demands for finer electrodes/lines.

For example, according to the metal line pattern formation technology disclosed by the present applicant (Patent Document 2) described above, it is possible to form an ultrafine metal line having a line width of 3 μm or less, exceeding the region visible to the naked eye. Then, in this technology, while the substrate is subjected to an appropriate treatment, the suitable configuration of the metal ink applied on this occasion is clearly shown. In this metal ink, an amine and a fatty acid are used as protective agents, and a suitable range is defined for each.

However, a study made by the present inventors has confirmed that in the above method for forming a metal line, the metal line may have abnormalities in electrical resistance. As such problems with lines, those caused by local shape defects or disconnection/short-circuiting have been confirmed.

Such problems with lines do not occur so frequently. In addition, the metal line pattern formation technology disclosed by the present applicant described above is aimed to meet extremely severe property requirements about the line width, and it is presumably difficult to completely suppress the problems. However, although it does not occur so frequently, when a problem occurs, the entire line is rejected, and thus the loss is huge. In addition, it is expected that property requirements for line patterns will demand finer and higher-precision patterns even more strictly in the future. In order to meet such a demand, the development of element technology for the stable formation of higher-quality lines than at present is necessary.

The present invention has been accomplished against the above background, and makes an approach to the formation of high-quality electrodes/lines from the standpoint of the configuration of a metal ink. The present invention provides a metal ink, which is unlikely to cause shape defects or disconnection and allows for the stable formation of high-quality electrodes/lines.

Means for Solving the Problems

In order to solve the above problems, the present inventors have studied the modes/causes of problems with lines occurring in the conventional art. As a result, they have found that faint printing or liquid gathering locally occurs in the printed line part, and such printing defects induce disconnection or appearance defects in the lines. Based on this, the present inventors have decided to study the configuration of the metal ink applied to the metal line pattern formation technology described above (Patent Document 2), particularly the configuration of a protective agent.

As above, in the metal ink described in Patent Document 2, two kinds of compounds, that is, an amine compound and a fatty acid in predetermined ranges, are used as protective agents. These two kinds of protective agents presumably exert the original action of protective agents, that is, suppressing the aggregation/coarsening of metal particles in the ink to stabilize the dispersion state.

As a measure for solving the above problems, the present inventors have decided to study fatty acids suitable as protective agents. The problems of printing defects with a metal ink also depend on the printing method or the substrate for printing, but are often attributable to the properties of the metal ink itself. Here, in a conventional metal ink, as a fatty acid serving as a protective agent, a $C_{4-20}$ unsaturated fatty acid or saturated fatty acid is to be applied. The reason why the number of carbon atoms in a fatty acid is limited is that a fatty acid having a low number of carbon atoms has a weak action as a protective agent, and the aggregation of metal particles tends to occur. Meanwhile, presumably, a fatty acid having a high number of carbon atoms is unlikely to evaporate from the metal particle surface after applied thereon and remains thereon, thereby possibly increasing the electrical resistance of an electrode/line.

In light of the above understanding, the present inventors have studied the applicability of a fatty acid exceeding the maximum number of carbon atoms ($C_{20}$) in the conventional art. As a result, they have found that even when a high-carbon fatty acid having more than 20 carbon atoms is applied, the electrical resistance of the formed electrode/line does not necessarily increase. Then, they have confirmed that when such a high-carbon fatty acid is applied, the formation of high-quality electrodes/lines can be achieved together with improvement in printability. Meanwhile, the present inventors have also found that when a fatty acid having more than a predetermined number of carbon atoms is applied, no matter how the application is dealt with, a suitable metal ink cannot be formed. That is, as the configuration of a metal ink with printability taken into consideration, they have found that with respect to the number of carbon atoms in a fatty acid serving as a protective agent, there exists a range with upper and lower limits different from those in the conventional art, and thus accomplished the present invention.

That is, the present invention is drawn to a metal ink containing silver particles, a protective agent A including an amine compound, and a protective agent B including a fatty acid. The metal ink is configured such that the protective agent A includes at least one $C_{4-12}$ amine compound, and the protective agent B includes at least one $C_{22-26}$ fatty acid.

As described above, the metal ink according to the present invention is composed of silver particles, which are metal particles, and an amine compound and a fatty acid, which serve as protective agents. Hereinafter, each configuration will be described in detail.

(I) Metal Particles

The metal particles dispersed in the metal ink of the present invention are, as described above, particles of silver. As the metal particles, those having an average particle size of 5 nm or more and 100 nm or less are preferable. In particular, in order to form a fine line having a small line width, the average particle size of the metal particles is preferably 30 nm or less. Meanwhile, excessively fine metal particles of less than 5 nm are likely to aggregate and thus have poor handleability.

Incidentally, the particle size of metal particles means the particle size of individual particles separated/dispersed in the metal ink, and is the particle size of metal particles (silver particles) excluding the protective agent part. Specifically, the size of only metal particles observed under an electron microscope, such as SEM or TEM, is referred to as "particle size". At this time, even when particles are in contact with each other, in the case where the grain boundary is clearly observed, such particles are judged as individual particles. Incidentally, in the measurement of the average particle size of metal particles, it is preferable that based on a TEM or like electron microscope image, 1,000 or more (preferably about 3,000) arbitrary particles are selected, the major axis and the minor axis of an individual particle are measured to calculate the particle size by a two-axis method, and the average of the selected particles is calculated.

Incidentally, in the present invention, in addition to the definition about the particle size of the metal particles themselves described above, the particle size distribution of the particles defined by dynamic light scattering (hereinafter sometimes referred to as "DLS") is also studied. Although the details will be given later, the particle size distribution by DLS is the particle size distribution of metal particles including the protective agent part. In addition, with respect to the particle size in this case, when particles aggregate together through a protective agent in the metal ink, the size of such an aggregation state is reflected in the particle size distribution by DLS. Incidentally, as used herein, the average particle size calculated by DLS measurement is referred to as "DLS average particle size."

The metal particle content in the metal ink is preferably 20 mass % or more and 70 mass % or less in terms of the metal mass relative to the metal ink mass. When the metal particle content is less than 20%, a metal pattern having a uniform film thickness for ensuring sufficient electrical conductivity cannot be formed, and the resistance of the metal pattern increases. When the metal particle content is more than 70%, the metal particles are likely to aggregate, and the printability may be deteriorated.

(II) Protective Agents

Next, protective agents applied in the present invention will be described. In the present invention, two kinds of protective agents, an amine compound as a protective agent A and a fatty acid as a protective agent B, are encompassed. The metal ink according to the present invention is required to contain both a $C_{4-12}$ amine compound (protective agent A) and a $C_{22-26}$ fatty acid (protective agent B).

(i) Amine Compound (Protective Agent A)

The amine compound referred to as "protective agent A" in the present invention mainly acts to suppress the aggregation of metal particles in the metal ink and maintain a fine particle state. The amine compound quickly evaporates/volatilizes upon low-temperature heating, such as a drying treatment after the application of the metal ink. Then, the number of carbon atoms in the amine compound affects the stability of metal particles and the sintering properties at the time of pattern formation, and thus is to be 4 or more and 12 or less.

With respect to the number of amino groups in the amine compound, a (mono)amine having one amino group or a diamine having two amino groups is applicable. In addition, the number of hydrocarbon groups bonded to an amino group is preferably one or two. That is, a primary amine ($RNH_2$) or a secondary amine ($R_2NH$) is preferable. Then, when a diamine is applied as a protective agent, it is preferable that at least one amino group is a primary amine or a secondary amine. The hydrocarbon group bonded to an amino group may be a chain hydrocarbon having a linear structure or a branched structure, or may alternatively a hydrocarbon group having a cyclic structure. In addition, oxygen may be partially contained.

Specific examples of amine compounds applied as protective agents in the present invention include butylamine ($C_4$), 1,4-diaminobutane ($C_4$), 3-methoxypropylamine ($C_4$), pentylamine ($C_5$), 2,2-dimethylpropylamine ($C_5$), 3-ethoxypropylamine ($C_5$), N,N-dimethyl-1,3-diaminopropane ($C_5$), hexylamine ($C_6$), heptylamine ($C_7$), benzylamine ($C_7$), N,N-diethyl-1,3-diaminopropane ($C_7$), octylamine ($C_8$), 2-ethylhexylamine ($C_8$), nonylamine ($C_9$), decylamine ($C_{10}$), diaminodecane ($C_{10}$), undecylamine ($C_{11}$), dodecylamine ($C_{12}$), and diaminododecane ($C_{12}$). Incidentally, as the amine compound serving as a protective agent A, for the purpose of adjusting the dispersibility of metal particles in the dispersion and the low-temperature sinterability, a mixture/combination of a plurality of kinds of amine compounds may also be used. However, when a mixture/combination of a plurality of kinds of amine compounds is used, the number of carbon atoms in the amine compounds is to be 4 or more and 12 or less.

It is preferable that the amine compound content in the metal ink according to the present invention is defined on a basis of the mass of the metal (silver) in the metal ink. The amine compound (protective agent A) content is preferably 0.2 mmol/g or more and 1.5 mmol/g or less on a metal mass basis. When the content is less than 0.2 mmol/g, it is difficult to suppress the aggregation of metal particles, while when it is more than 1.5 mmol/g, the amine compound may remain at the time of printing. Incidentally, when a plurality of kinds of amine compounds are used, the total of the contents of individual amine compounds is applied as the amine compound content. In addition, as a method for measuring the amine compound content, gas chromatography (GC), GC-MS, TG-MS, and the like are applicable. Even when a plurality of kinds of amine compounds are used, the content can be measured by suitably combining these analysis means.

(ii) Fatty Acid (Protective Agent B)

As described above, the metal ink according to the present invention is characterized in that the fatty acid applied as a protective agent B is a high-carbon fatty acid. According to the results of the study by the present inventors, although there is a tendency that a high-carbon fatty acid is unlikely to volatilize even upon heating after the application of a metal ink, this does not immediately lead to an increase in the resistance of an electrode/line. Rather, the application of a fatty acid with a moderately high number of carbon atoms can contribute to improvement in the printability of a metal ink. The number of carbon atoms set in terms of this printability improvement is 22 or more. When the number of carbon atoms in the fatty acid is lower than this, no matter how its kind, addition conditions, and the like are adjusted, the reliability about printability cannot be provided to the extent of the present invention.

Meanwhile, when a fatty acid having an excessively high number of carbon atoms is applied, it becomes difficult to produce a metal ink itself.

Although such a phenomenon is unexpected also to the present inventors, when a fatty acid having an excessively high number of carbon atoms is added, the viscosity of the metal ink rapidly increases, and such an ink is solidified/gelated losing fluidity, which cannot serve as an ink. Specifically, when a fatty acid having more than 26 carbon atoms is applied, the problems of solidification/gelation occur in the ink. Such a problem does not occur in a $C_{22-26}$ fatty acid, and a metal ink in a suitable state can be formed.

Based on the above reasons, in the present invention, the addition of a $C_{22-26}$ fatty acid is indispensable. Such acids include both saturated fatty acids and unsaturated fatty acids.

Specific examples of fatty acids applied in the present invention include, as $C_{22-26}$ saturated fatty acids, behenic acid (also called: docosanoic acid, $C_{22}$), tricosanoic acid ($C_{23}$), lignoceric acid (also called: tetracosanoic acid, $C_{24}$), pentacosanoic acid ($C_{25}$), and cerotic acid (also called: hexacosanoic acid, $C_{26}$). Examples also include, as $C_{22-26}$ unsaturated fatty acids, erucic acid ($C_{22}$) and nervonic acid (also called: cis-15-tetrachocenic acid, $C_{24}$). Among these fatty acids, erucic acid, lignoceric acid, and nervonic acid are particularly preferable. Incidentally, also as the fatty acid serving as a protective agent B, a combination of a plurality of kinds of $C_{22-26}$ fatty acids may also be used. Further, as long as at least one kind of $C_{22-26}$ fatty acid is contained, a low-carbon fatty acid may be additionally contained. Specifically, $C_{14-21}$ fatty acids are acceptable.

Here, the $C_{22-26}$ fatty acid (protective agent B) content is preferably adjusted to an appropriate amount. As compared with amine compounds, fatty acids have relatively high bonding strength to metal particles, and thus may remain after the application of a metal ink and the heating treatment. The present inventors' opinion is that, even so, an increase in the resistance of lines does not necessarily always occur, and they consider that this is caused by the sintering behavior of metal particles.

That is, when metal particles are heated, particles bond to each other, resulting in a state close to a bulk metal. However, such a state is not completely dense but slightly contains voids (space). Such voids are attributed to the particle size of metal particles, their particle size distribution, and the like, for example, which are factors irrelevant to protective agents, and complete suppression is impossible. However, the presence of such voids is within the scope of assumption when metal particles are used as a line precursor, and even when voids are present, the sintered compact exerts electrical conductivity useful as an electrode/line.

When the presence of voids in a sintered compact is affirmed, the presence of a protective agent (fatty acid) therein does not affect the electrical conductivity. That is, presumably, even when a protective agent (fatty acid) in the metal ink remains in a sintered compact, when its volume corresponds to the voids, the electrical characteristics of the line are not greatly affected.

Based on the above considerations, the fatty acid (protective agent B) content in the metal ink of the present invention is preferably 0.01 mmol/g or more and 0.06 mmol/g or less on a metal mass basis. When the content is less than 0.01 mmol/g, there is no effect as a protective agent, and, even when the amine compound (protective agent A) content is made suitable, the aggregation of metal particles may occur. Meanwhile, when the fatty acid is more than 0.06 mmol/g, the electrical resistance of the formed line/electrode may increase. Incidentally, when a plurality of kinds of fatty acids are used, the total number of moles is applied as the content. The fatty acid content can also be measured by GC, GC-MS, TG-MS, or the like.

Incidentally, in the present invention, as described above, in addition to the $C_{22-26}$ fatty acid expected to serve as an effective protective agent, the presence of a low-carbon fatty acid ($C_{14-21}$ fatty acid) is allowed. However, even in such a case, it is preferable that the content of all the fatty acids is 0.06 mmol/g or less on a metal mass basis. For example, when the metal ink contains 0.06 mmol/g of a $C_{22-26}$ fatty acid, it is preferable that no low-carbon fatty acid is contained. In addition, when the metal ink contains 0.01 mmol/g of a $C_{22-26}$ fatty acid, it is undesirable that more than 0.05 mmol/g of a low-carbon fatty acid is contained.

(iii) Relationship between Amine Compound and Fatty Acid

The metal ink of the present invention contains both an amine compound and a fatty acid, and the suitable range of each content is as described above. Here, as is clearly shown from comparison between the suitable ranges, as the metal ink of the present invention, it is preferable that an amine-rich metal ink, in which an amine compound is contained in excess of a fatty acid, is assumed. The purpose of assuming amine-rich is to preferentially ensure the low-temperature sinterability of the metal ink.

The relationship between the low-temperature sinterability of a metal ink and the configuration of protective agents will be described. First, when an amine compound and a fatty acid are compared in terms of the behavior as a protective agent, an amine compound has weaker boning to silver particles and is presumably desorbed (evaporated) at a relatively low temperature. Then, the present invention is targeted at a fatty acid having a relatively high number of carbon atoms, and such a fatty acid tends to remain on the silver particle surface.

Here, in the process of line formation by printing a metal ink, the functional group on the substrate surface bonds to the silver surface to immobilize silver particles onto the substrate surface, whereby a metal line is formed. At this time, the following model will be possible: an amine compound, whose bonding is relatively weak, is desorbed from silver particles, and, at the same time, the functional group on the substrate surface is adsorbed onto the silver surface. In such a process, of the protective agents on the surface of silver particles (amine compound and fatty acid), when the fatty acid, which is unlikely to be desorbed, increases exceeding a certain proportion, even if the amine is desorbed, the fatty acid may serve as a steric hindrance, inhibiting the approach between the substrate and silver particles. Then, as a result, in some areas, silver particles are not fixed to the substrate surface, or fixing is insufficient. When calcination is performed with immobilization left insufficient like that, even if a metal (silver) line is seemingly formed, such a line may have no electrical conduction.

Thus, as in the present invention, in a metal ink containing both an amine compound and a fatty acid, each having a predetermined number of carbon atoms, as protective agents, it is preferable that the metal ink is amine-rich for ensuring low-temperature sinterability, and also the proportion of each protective agent is adjusted. Specifically, it is preferable that their ratio (amine compound content/fatty acid content) is 5.0 or more.

When the ratio of protective agents (amine compound content/fatty acid content) is less than 5.0, that is, the proportion of the fatty acid increases, the bonding between silver particles and the substrate may become insufficient due to the steric hindrance of the fatty acid as described above. As a result, it is highly likely that when a line is printed on the substrate, even if a metal line is apparently formed, a region having no conduction is formed.

Meanwhile, it is not necessary to particularly set an upper limit on the ratio of the amine compound content to the fatty acid content. When the amine compound content and the fatty acid content are each within a suitable range, and the ink is suitably made amine-rich, bonding defects between silver particles and the substrate are unlikely to occur. In addition, because of the action of the fatty acid, the printability of the metal ink is excellent. However, there is a concern that an excessive amount of amine compound may affect printability. Accordingly, the ratio of protective agents (amine compound content/fatty acid content) is preferably 120.0 or less. Incidentally, as contents for the calculation of the amine compound/fatty acid ratio, the molar amounts on a metal mass basis (mol/g (mmol/g)) are preferably employed.

(III) Other Configuration of Metal Ink

The metal particles, amine compound (protective agent A), and fatty acid (protective agent B) described above are dispersed in a suitable solvent. Solvents applicable in the present invention are organic solvents, and examples thereof include alcohol, benzene, toluene, and alkane. They may also be mixed. Preferred solvents are alkanes, such as hexane, heptane, octane, nonane, and decane, and alcohols, such as methanol, ethanol, propanol, butanol, pentanol, hexanol, heptanol, octanol, nonanol, and decanol. The solvent is more preferably a mixed solvent of at least one kind of alcohol and at least one kind of alkane selected from them.

(IV) Particle Size Distribution of Metal Ink

In the metal ink according to the present invention described above, the fatty acid serving as a protective agent has a number of carbon atoms within an appropriate range. As a result, the metal ink has excellent printability such that faint printing or liquid gathering is unlikely to occur at time of application to a substrate. Here, according to the present inventors, they consider that the improved over-time stability of metal particles in the metal ink itself acts as a factor of printability improvement in the present invention, in addition to the ensuring of stability at the time of application that a fatty acid originally has.

Speaking of the over-time stability of metal particles in the metal ink, a conventional metal ink has a uniform particle size distribution at the time of production, and coarse agglomerates are rarely formed. This is attributable to its production method (silver-amine complex method) and the action of an amine compound, a main protective agent. That is, the formed fine silver particles are quickly protected by the amine serving as a protective agent, whereby aggregation is suppressed. However, according to the study by the present inventors, even in such a metal ink having a uniform particle size distribution without agglomerates, with the lapse of time, the metal particles may partially undergo agglomeration/coarsening. Then, use of the metal ink containing coarse agglomerates may cause printing defects.

In the metal ink applying a specific fatty acid according to the present invention, because of the action of the fatty acid, the over-time stability of metal particles improves, and the frequency of occurrence of coarse agglomerates is suppressed. This is believed to the effect of using a suitable amount of a fatty acid having a higher number of carbon atoms than conventional.

As a specific standard for the particle size distribution of a metal ink, it is preferable that the proportion of coarse agglomerates having a particle size of 500 nm or more in a particle size distribution based on dynamic light scattering is 5% or less in volume fraction.

Here, dynamic light scattering (DLS) is an analysis method utilizing the phenomenon that when particles that undergo Brownian motion in a solution like a metal ink are irradiated with laser light, the light intensity distribution of the scattered light differs depending on the particle size. In this method, the particle size distribution is measured by such an analysis. The metal ink, which is a target of the present invention, is a liquid/fluid having dispersed therein nano-order fine metal particles. For the measurement of the particle size distribution of particles dispersed in such a liquid/fluid, the application of DLS is suitable. Then, as described above, the particle size distribution measured by DLS is the particle size distribution of metal particles including the protective agent part and metal particles in an aggregated state. Incidentally, the particle size of metal particles themselves excluding protective agents is measured by observing the metal particles in a dry state under the electron microscope described above.

Then, in the present invention, it is preferable that the volume fraction of coarse agglomerates having a particle size of 500 nm or more measured by DLS is 5% or less. This is because when the volume fraction of coarse agglomerates having a particle size of 500 nm or more is more than 5%, it is highly likely that printing defects occur at the time of application to a substrate. Incidentally, when the configuration of the metal ink of the present invention is defined by DLS, it is preferable that the average particle size (DLS average particle size) of dispersed particles in the metal ink is 5 nm or more and 200 nm or less.

(V) Electrical Characteristics of Metal Ink According to the Present Invention

The metal ink according to the present invention described above prevents the occurrence of printing defects while suppressing an increase in the electrical resistance of the formed electrode/line. In the present invention, it is preferable that when 100 μL of the metal ink is applied by spinning at a rotation speed of 2,000 rpm for 1 minute by a spin coat method and then calcined at 120° C., the resulting electrical conductor has a volume resistance of 5 μΩcm or more and 20 μΩcm or less.

(V) Method for Producing Metal Ink

Next, a method for producing the metal ink according to the present invention will be described. The metal ink according to the present invention can be produced by dispersing silver particle containing the above protective agents (amine compound, fatty acid) in a suitable solvent. Here, as a method for producing silver particles, it is preferable to employ a silver-amine complex method, in which a silver-amine complex is used as a precursor. In this silver particle production method, a thermally decomposable silver compound, such as silver oxalate, is used as a starting material, and an amine compound serving as a protective agent is allowed to react therewith to form a silver-amine complex. Then, the silver-amine complex is heated as a precursor to give silver particles. Such a silver-amine complex method makes it possible to produce silver particles that are fine and have a uniform particle size.

The method for producing silver particles will be described in detail. First, as the silver compound serving as a starting material, it is preferable to use silver oxalate, silver nitrate, silver acetate, silver carbonate, silver oxide, silver nitrite, silver benzoate, silver cyanate, silver citrate, silver lactate, or the like. Among these silver compounds, silver oxalate ($Ag_2C_2O_4$) or silver carbonate ($Ag_2CO_3$) is particularly preferable. Silver oxalate and silver carbonate can be decomposed at a relatively low temperature to form silver particles even without a reducing agent.

Incidentally, silver oxalate is explosive in a dry state. Accordingly, it is preferable that silver oxalate is mixed with water or an organic solvent (alcohol, alkane, alkene, alkyne, ketone, ether, ester, carboxylic acid, fatty acid, aromatic, amine, amide, nitrile, etc.) and thus wetted to ensure handleability, and then utilized. In addition, silver carbonate has low possibility of explosion unlike silver oxalate. However, when previously wetted, silver carbonate can be more easily mixed with an amine compound and a fatty acid serving as protective agents. Therefore, water or an organic solvent is preferably mixed. When silver oxalate or silver carbonate is wetted, it is preferable that 5 to 200 parts by weight of water or an organic solvent is mixed per 100 parts by weight of a silver compound.

A silver-amine complex serving as a precursor of silver particles is formed by mixing/reacting the above silver compound with an amine compound. The amine compound acts also as a protective agent in the metal ink. Therefore, as the amine compound used herein, the $C_{4-12}$ amine compound described above is applied.

Then, together with the amine compound, a fatty acid serving as a protective agent B is added. The present invention is characterized by applying a $C_{22-26}$ fatty acid, and thus the fatty acid added herein is also the same one.

When an amine compound and a fatty acid is added to a silver compound, the order of addition is preferably such that the amine compound is added first, or the amine compound and the fatty acid are simultaneously added. That is, it is possible that an amine compound and a silver compound are mixed to form a silver-amine complex, and then a fatty acid is added, or it is also possible that an amine compound and a fatty acid are simultaneously added to a silver compound to form a silver-amine complex. In addition, when a plurality of amine compounds are added, it is also possible that some of amine compounds are previously allowed to react with a silver compound, and then the rest of amine compounds are added. In this case, a fatty acid may be added together with the addition of the rest of amine compounds.

The amounts of protective agents (amine compound and fatty acid) mixed in the production of a metal ink are each preferably 2 times to 100 times the suitable amount in the metal ink described above. The purpose of making the amounts of protective materials in the metal ink production step in excess of the suitable contents in the ink state is to eliminate unreacted silver compound and form a sufficient silver-amine complex, and also make the amounts of protective agents within suitable ranges at the time of the formation of silver particles form the silver-amine complex. At this time, even when excess protective agents are adsorbed onto the silver particles, the amounts of protective agents can be appropriately adjusted through the washing step.

A reaction between the silver compound and the amine compound forms a silver-amine complex, and a reaction system for silver particle production is formed. Subsequently, the reaction system is heated, whereby silver particles are formed. The heating temperature at this time is preferably equal to or higher than the decomposition temperature of the formed silver-amine complex. The decomposition temperature of a silver-amine complex differs depending on the kind of amine coordinated to the silver compound. However, in the case of a silver complex of the amine compound applied in the present invention, the specific decomposition temperature is 90 to 130° C.

Through this heating step, silver particles having bonded thereto protective agents are precipitated. The silver particles can be recovered by the solid-liquid separation of the reaction mixture. The recovered silver particles are appropriately washed, thereby giving silver particles to serve as a raw material of a metal ink.

The step of washing the formed silver particles also acts to adjust the amounts of protective agents (amine compound and fatty acid) adsorbed onto the silver particles. In the step of synthesizing of silver particles, as described above, an amine and a fatty acid may be introduced in excess of silver particles, and such amounts are not necessarily appropriate as the amounts of protective agents of silver particles. Thus, the amounts of protective agents are appropriately adjusted through the washing step, whereby the protective agent contends in the metal ink subsequently produced can be made suitable.

In the washing step, it is preferable that the kind of washing liquid, the liquid amount, and the number of times of washing are suitably set. Specifically, as the washing liquid, it is preferable to apply an alcohol, such as methanol, ethanol, propanol, or butanol, or octane. The amount of washing liquid is preferably 1 to 10 times the silver weight. Then, the number of times of washing is preferably 2 to 5. When the liquid amount or the number of times of washing is excessive, it may happen that the amine compound serving as a protective agent A is removed too much, resulting in the possibility of formation of a metal ink having reduced amounts of protective agents. In addition, when the liquid amount or the number of times of washing is insufficient, this leads to insufficient washing, resulting in the formation of a metal ink having excessive amounts of protective agents. Incidentally, in the washing operation, it is preferable that silver particles and the washing liquid are mixed and stirred, and then solid-liquid separation is performed by filtration, centrifugation, or the like. These procedures are defined as one washing operation and preferably performed a plurality of times.

The silver particles produced and suitably washed as above are dispersed in a solvent, whereby the metal ink of the present invention can be produced. The preferred amounts of solvent and silver particles mixed are as above.

Advantageous Effects of the Invention

The metal ink according to the present invention applies a $C_{22-26}$ fatty acid as a protective agent. As a result, in the metal ink, printing defects are suppressed. With the metal ink according to the present invention, a silver electrode/line can be formed at a relatively low temperature, and a high-precision/high-quality metal line can be efficiently formed.

DESCRIPTION OF EMBODIMENTS

First Embodiment

Figure 1:
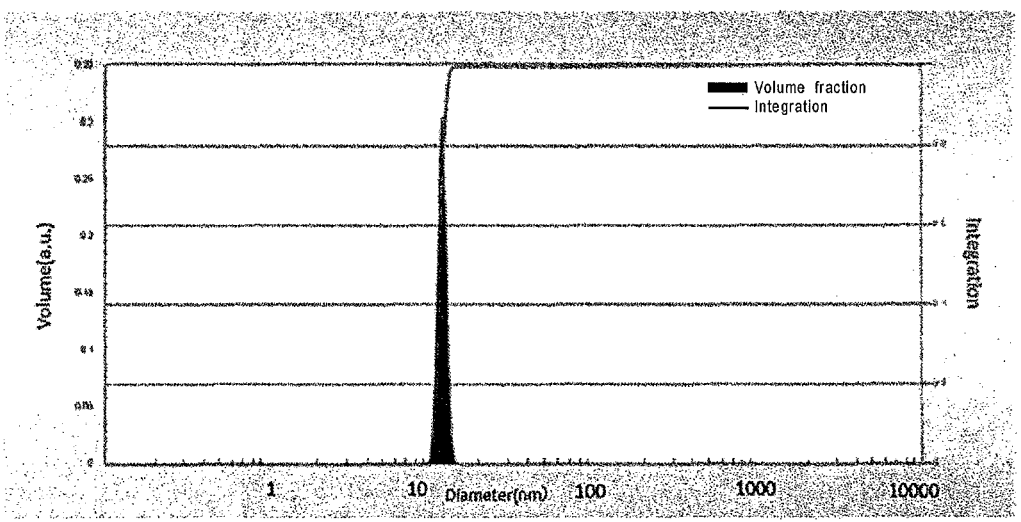
FIG. 1 is a graph showing the results of DLS measurement of the particle size distribution of the metal ink of a first embodiment.
Figure 1:
Figure 1:
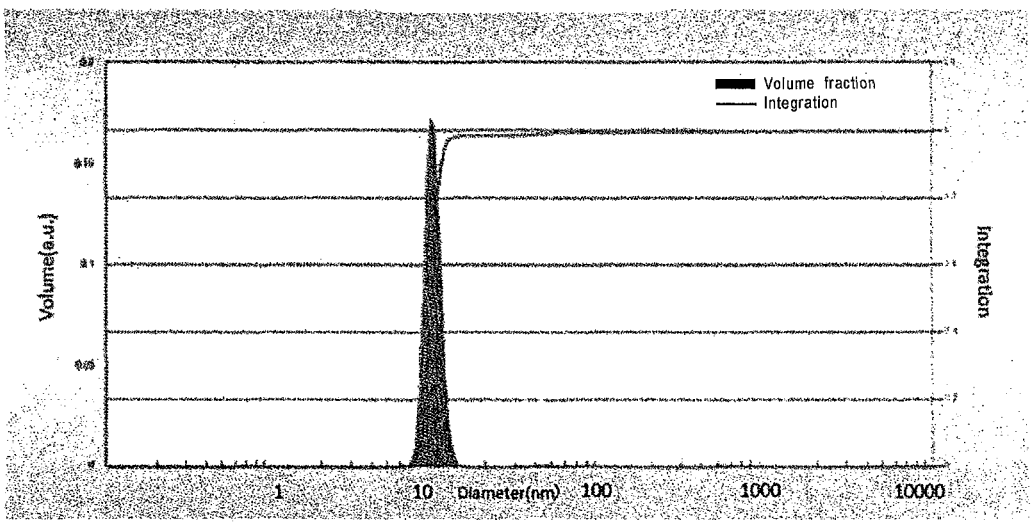

Hereinafter, preferred embodiments of the present invention will be described. In the present embodiment, a metal ink (silver ink) applying erucic acid ($C_{22}$) as a fatty acid was produced and printed on a substrate to form silver lines, and the presence of printing defects was evaluated. In the evaluation of printing defects, a comparison was made with a conventional metal ink.

[Production of Silver Ink]

In the present embodiment, silver particles produced by a thermal decomposition method were dispersed in a solvent to produce a metal ink. In the production of silver particles, 0.651 g of methanol was added to 1.519 g of silver oxalate (silver: 1.079 g) serving as a starting material to cause wetting. Then, amine compounds and a fatty acid each serving as a protective agent were added to the silver oxalate. Specifically, first, N,N-dimethyl-1,3-diaminopropane (0.778 g (7.61 mmol)) was added and kneaded for a while, and then hexylamine (1.156 g (11.42 mmol)), dodecylamine (0.176 g (0.95 mmol)), and erucic acid (0.0443 g (0.131 mmol)) were added and kneaded, followed by heating and stirring at 110° C. During this heating and stirring, the cream-colored silver complex gradually became brown and further became black. This heating/stirring operation was performed until the occurrence of bubbling from the reaction system stopped.

After the completion of the reaction, the reaction system was allowed to cool to room temperature, and then methanol (2 g) was added and thoroughly stirred, followed by centrifugation (2,000 rpm, 60 s). The supernatant was removed, solid-liquid separation was performed, methanol (2 g) was added again and stirred, centrifugation was performed, and the supernatant was removed. Finally, methanol was added once again, and the same washing operation was performed. Like this, the washing operation with a solvent was repeated three times, whereby excess protective agents were removed, and the silver particles were purified.

Then, to the produced silver fine particles, a mixed solvent of octane and butanol (octane:butanol=4:1 (volume ratio)) was added to give a silver ink. The metal ink produced through the above steps has a silver concentration of 50 mass %.

The contents of the amine compounds and the fatty acid, which are protective agents, in the silver ink produced through the above steps were analyzed. In the present embodiment, the analysis was performed by GC-MS. As the GC-MS analyzer, 7890B manufactured by Agilent Technologies, Inc., was used for the GC part, and JMS-Q1500GC manufactured by JEOL Ltd., which is a quadrupole mass spectrometer, was used for the MS part. As the ionizing method, photoionization was used. In addition, for the GC sample introduction part, a pyrolyzer manufactured by Frontier Laboratories Ltd., was installed and used. At the time of analysis, the metal ink was diluted 12.5-fold by volume, and then 5 μL was subjected to the analysis. Other measurement conditions were as follows.

<GC Conditions>

Column: UA-530M-0.25F (manufactured by Frontier Laboratories Ltd.)

Column flow rate: 1.0 ml/min. He

Split ratio: 30

Oven temperature setting: 40° C., 6 min.→heating (10° C./min.)→360° C., 2 min.

Inlet temperature: 250° C.

<MS Conditions>

Q-pole temperature: 70° C.

Ion source temperature: 200° C.

Mode: Scan (m/z=10 to 350)

Photoionization energy: 10.18 eV or higher

As a result of the quantitative analysis by GC-MS described above, the amine compound content (the total amount of N,N-dimethyl-1,3-diaminopropane, hexylamine, and dodecylamine) was 0.73 mmol/g on a silver mass basis, and the fatty acid (erucic acid) content was 0.025 mmol/g on a silver mass basis. The ratio of the amine compound content to the fatty acid content was 29.2.

Comparative Example

As a conventional metal ink, a metal ink containing oleic acid ($C_{18}$) as a protective agent was prepared (the amine compounds are the same as in the embodiment). The method for producing this metal ink is almost the same as in the metal ink production step of the present embodiment. In the comparative example, N,N-dimethyl-1,3-diaminopropane was added to silver oxalate in a wet state and kneaded, and then hexylamine, dodecylamine, and oleic acid (0.037 g (0.131 mmol)) were added and kneaded. The amounts of silver oxalate and amine compounds used are the same as in the present embodiment. Then, the operation after the addition of oleic acid was also the same as in the embodiment, and the metal ink was thus produced.

Also, in this comparative example, as in the first embodiment, the amine compound content and the fatty acid content were analyzed (GC-MS). As a result, the amine compound content (the total amount of N,N-dimethyl-1,3-diaminopropane, hexylamine, and dodecylamine) was 0.71 mmol/g on a silver mass basis, and the fatty acid (erucic acid) content was 0.028 mmol/g on a silver mass basis. The ratio of the amine compound content to the fatty acid content was 25.35.

[Evaluation of Particle Size Distribution of Metal Ink]

The metal inks produced above were subjected to the measurement of particle size distribution by DLS. As the analyzer for the particle size distribution by DLS, VASCO2 manufactured by CORDOUAN (laser wavelength: 657 nm) was used. The viscosity of an octane-butanol mixed solvent necessary for the calculation of particle size distribution was set at an actual measured value of 0.635 cP, while the refractive index was set at the literature data (1.391), and the measurement was performed at 25° C. After the measurement, the obtained data were analyzed with the software stored in the device. SBL was selected as the analysis method, and a particle size distribution on a volume basis was prepared. This measurement was performed on a metal ink after one day from production and a metal ink after 20 days from production.

Figure 2:
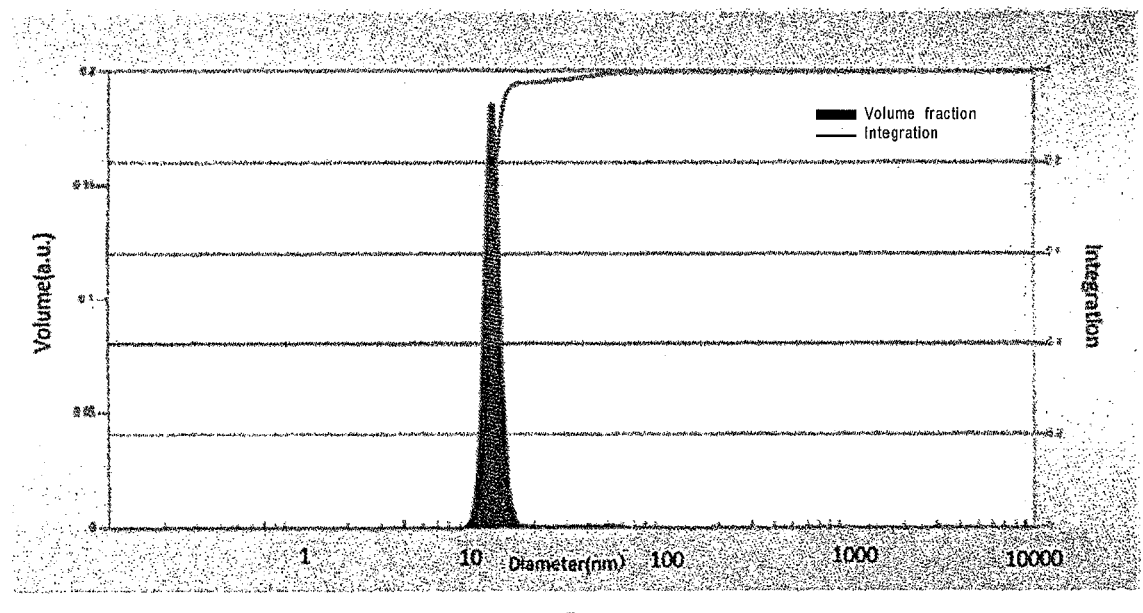
FIG. 2 is a graph showing the results of DLS measurement of the particle size distribution of the metal ink of a comparative example.
Figure 2:
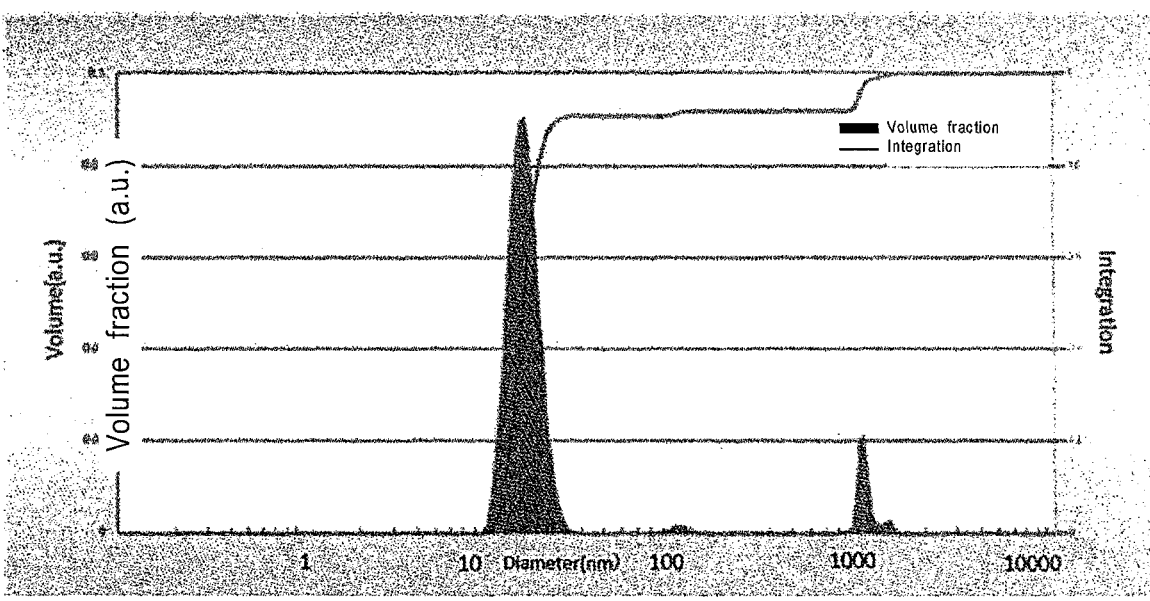

FIG. 1 shows the results of DLS measurement of the particle size distribution of the metal ink according to the present embodiment, and FIG. 2 shows the results of DLS measurement of the particle size distribution of the metal ink according to the comparative example. From these DLS particle size distribution graphs, at the stage after one day from production, no excessive aggregation of metal particles was observed both in the present embodiment and the comparative example. However, after 20 days from production, in the metal ink of the comparative example containing oleic acid as a protective agent, a peak indicating the presence of coarse agglomerates was observed near a particle size of about 1,000 nm. Then, the volume fraction of coarse agglomerates having a particle size of 500 nm or more in the comparative example was 7.4%.

Meanwhile, in the metal ink of the present embodiment containing erucic acid as a protective agent, the formation of coarse agglomerates as in the comparative example was not seen. In the case of the metal ink of the present embodiment, even after 20 days from production, the number of peaks observed in the particle size distribution profile was only one, and a peak of coarse agglomerates was not seen.

[Metal Line Production Test]

Next, the metal inks of the present embodiment and the comparative example, each after 20 days from implementation/production, were used to produce metal lines. Here, metal lines were formed based on the method of Patent Document 2 described above, and the presence of printing defects was studied.

As a substrate for the formation of metal lines, a transparent resin substrate made of polyethylene naphthalate (PET) (dimension: 150 mm×150 mm, thickness: 100 μm) was prepared. In the present embodiment, in a predetermined region of this substrate (125 mm in length×6 mm in width), grid-like metal lines were formed. Specifically, grid-like metal lines having a line width (L) of 2 μm at intervals (S) of 300 μm (L/S=2 m/300 μm) were formed.

According to the metal line formation method in accordance with the method of Patent Document 2 described above, an amorphousness perfluorobutenyl ether polymer (CYTOP (registered trademark): manufactured by Asahi Glass Co., Ltd.), which is a liquid-repellant fluorine-containing resin, was applied to a substrate by a spin coat method (rotation speed: 2,000 rpm, 20 s), then heated at 50° C. for 10 minutes and subsequently at 80° C. for 10 minutes, further heated in an oven at 100° C. for 60 minutes, and calcined.

Next, a photomask having a grid-like line pattern (line width: 2.0 μm) was closely attached to the surface of the substrate having formed thereon a fluororesin layer (contact exposure at a mask-substrate distance of 0), followed by irradiation with UV light (VUV light). The VUV light irradiation was performed at a wavelength of 172 nm and 11 mW/cm$^{-2}$ for 20 seconds.

To the substrate having a functional group formed by exposing the fluorine resin layer surface to light as described above, the metal ink was applied. Application was performed such that three drops of 1 μL of the ink were equally disposed on the substrate, and the drops were swept in one direction with a blade (applicator). Here, the sweep rate was set at 2 mm/s. It was confirmed that as a result of the application with a blade, the ink adhered only to the UV light irradiation part (functional group formation part) of the substrate. Then, the substrate was dried with hot air at 120° C., and silver lines (L/S=2 μm/300 μm) were formed.

Figure 3A:
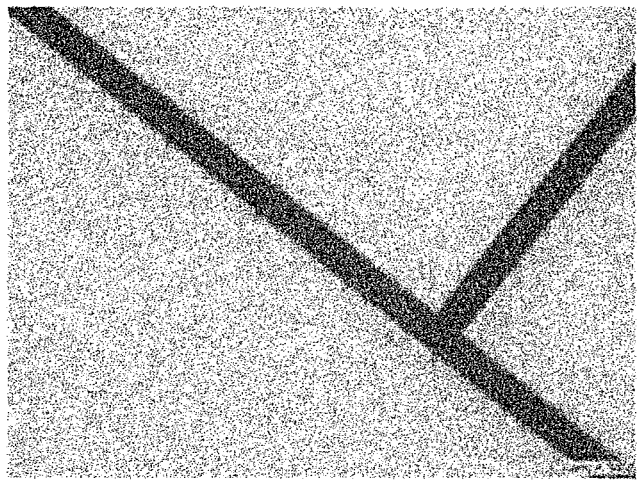
FIGS. 3A and 3B illustrate photographs showing the appearance of metal lines formed from the metal ink of the first embodiment and that of the comparative example.
Figure 3B:
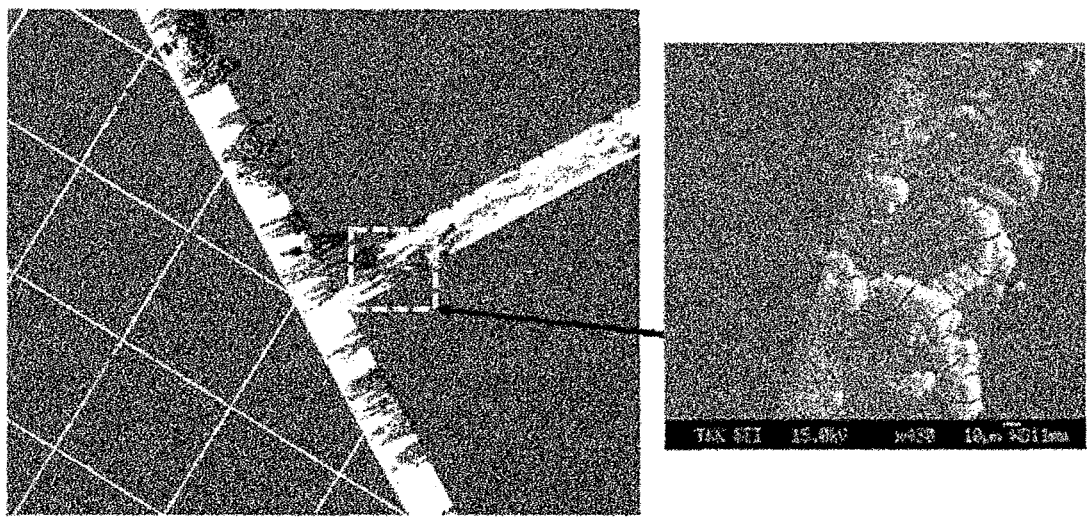

The silver lines formed as above were observed under an optical microscope and an electron microscope (SEM), and the presence of printing defects, such as faint printing of lines or appearance defects, was studied. In the metal lines formed from the metal ink of the present embodiment, printing defects were not observed, and the conditions were entirely clear (FIG. 3A). Meanwhile, in the case of the ink of the comparative example containing oleic acid as a protective agent, as shown in FIG. 3B, faint printing and liquid gathering occurred in some areas of the lines.

As described above, printing defects were observed in the comparative example, in which a metal ink containing $C_{18}$ oleic acid as a protective agent was used. When the example and the comparative example are compared, the difference between them is only the number of carbon atoms in a fatty acid, and the amine compounds serving as a protective agent A are the same. In addition, in view of the amounts of protective agents, the amine compound content and the fatty acid content are not much different between the example and the comparative example. In the comparative example, with respect to the protective agent contents, even when the suitable values applied in the examples were applied, printing defects occurred.

Second Embodiment

Here, the kind of fatty acid serving as a protective agent was varied to produce metal inks. In addition, a metal ink in which, in addition to silver oxalate, silver carbonate was also used as a silver compound serving as a raw material was also produced. Then, the stability of the produced metal inks, which presumably relates to the occurrence of printing defects, was evaluated.

In the present embodiment, the metal ink production step using silver oxalate is approximately the same as in the first embodiment. That is, N,N-dimethyl-1,3-diaminopropane was added to silver oxalate in a wet state and kneaded, and then hexylamine, dodecylamine, and 0.131 mmol of each fatty acid were added and kneaded. The amounts of silver oxalate and amine compounds used are the same as in the present embodiment. In addition, the operation after the addition of each fatty acid was also the same as in the embodiment, and the metal inks were thus produced.

In addition, the metal ink production step using silver carbonate as a raw material was performed as follows. 0.651 g of methanol was added to 1.379 g of silver carbonate (silver: 1.079 g) to cause wetting. Then, to this silver carbonate, octylamine (0.478 g (3.705 mmol)), hexylamine (1.156 g (11.42 mmol)), dodecylamine (0.176 g (0.95 mmol)), and 0.131 mmol of each fatty acid were added and kneaded. Then, this silver-amine complex was heated and stirred at 110° C. After the completion of the reaction, silver fine particles were washed and recovered in the same manner as in the first embodiment. Then, a solvent (octane: butanol=4:1 (volume ratio)) was added to the silver fine particles to produce a silver ink (silver concentration: 50 mass %).

With respect to the metal ink produced in the present embodiment, the protective agent contents were measured by GC-MS in the same manner as in the first embodiment. Then, after 20 days from production, the particle size distribution was measured by the DLS method under the same measurement conditions as in the first embodiment.

In the DLS measurement of particle size distribution in the present embodiment, with respect to each metal ink, the average particle size based on all the particles dispersed in the ink (DLS average particle size) was calculated. Then, the volume fraction of agglomerates having a particle size of 500 nm or more was measured. At this time, when the volume fraction of coarse agglomerates having a particle size of 500 nm or more was 5% or less, a rating of "acceptable (○)" was given.

(A) Evaluation of Printability

Next, the same substrate as in the first embodiment was prepared, metal lines were formed, and the printability of the metal ink was evaluated. By the same method as in the first embodiment, metal lines (grid-like metal lines having L/S=2 μm/300 μm) were formed in a region of 125 mm in length×6 mm in width. Then, the formed metal lines were first subjected to the evaluation of printability by the observation of appearance. Here, the entire metal lines were observed, and when printing defects, such as faint printing and liquid gathering, were seen even partially, a rating of "unacceptable (×)" was given, while when there were completely no defects, a rating of "acceptable (○)" was given.

Next, the conduction of the metal lines was measured to confirm the soundness of the lines, which cannot be judged from appearance only. In this test, within the region where metal lines were formed (region of 125 mm in length×6 mm in width), terminals of a digital tester were brought into contact with two arbitrary points of the metal lines, where conduction is supposed to occur according to the pattern shape, and the electrical resistance was measured to confirm the presence of conduction. Ten sets of this measurement were performed. When conduction was confirmed in all, a rating of "○" was given, when conduction was confirmed in 8 or more points, "Δ" was given, and "×" was given to other cases.

Then, the results of the appearance test and the results of the conduction test were put together to judge the printability. In this overall evaluation, inks rated as "○" both in appearance and conduction were rated as "excellent (⊚)". Meanwhile, inks rated as "Δ" in the conduction test were rated as "non-defective (○)" in the overall evaluation. Inks rated as "×" in either the appearance test or the conduction test were rated as "defective (×)" in the overall evaluation.

(B) Evaluation of Electrical Characteristics

Further, in the present embodiment, an electrical conductor was formed from each metal ink, and its electrical characteristics (electrical resistance) were measured. The reason why electrical conductors are produced and evaluated like this in addition to the conduction test for printability is that the scope of application of the metal ink was taken into consideration. That is, the metal lines produced in the present embodiment as described above are lines having a relatively small line width (2 μm). Here, in metal lines, in addition to the demand for smaller line width/line pitch, it is sometimes demanded to achieve a three-dimensional structure by applying a metal ink a plurality of times, for example. It can be said that in order to meet such various demands, it is preferable to understand the tendency of the electrical characteristics of the metal ink itself. Thus, in the present embodiment, onto a PET substrate having no pattern formed, a certain amount of metal ink was applied to form an electrical conductor, and, from its electrical characteristics, the suitability as a metal line precursor was evaluated.

In this evaluation test, 100 μL of a metal ink was spin-coated to a PET substrate (2,000 rpm) and then calcined in air at 120° C. for 30 minutes, thereby forming an electrical conductor having a dimension of ×25×25 mm. The volume resistance of this electrical conductor (μΩm) was measured by use of a resistivity meter (Loresta-GP MCP-T610 manufactured by Mitsubishi Chemical Analytech Co., Ltd.). Then, a volume resistance of 20 μΩm or less was rated as "acceptable (○)".

With respect to each of the metal inks produced in the present embodiment, Table 1 shows the measurement results of particle size distribution, the evaluation results upon the formation of metal lines, and the evaluation results of electrical characteristics.

TABLE 1

| | | Fatty acid | | Protective agent content (mmol/g) | | | Particle size distribution[*2] |
|---|---|---|---|---|---|---|---|
| No. | Silver compound | Name | Number of carbon atoms | Amines[*1] | Fatty acid | Amine/ fatty acid | DLS average particle size[*3] |
| 1 | Silver oxalate | Oleic acid | 18 | 0.71 | 0.028 | 25.4 | 93 nm |

TABLE 1-continued

| No. | | | | | | | |
|---|---|---|---|---|---|---|---|
| 2 | Silver carbonate | | | 1.13 | 0.018 | 62.8 | 213 nm |
| 3 | Silver oxalate | Eicosanoic acid | 20 | 0.88 | 0.022 | 40.0 | 64 nm |
| 4 | Silver oxalate | Erucic acid | 22 | 0.73 | 0.025 | 29.2 | 10 nm |
| 5 | Silver carbonate | | | 1.08 | 0.016 | 67.5 | 48 nm |
| 6 | Silver oxalate | Lignoceric acid | 24 | 0.61 | 0.02 | 30.5 | 12 nm |
| 7 | Silver carbonate | | | 1.28 | 0.014 | 91.4 | 32 nm |
| 8 | Silver oxalate | Hexacosanoic acid | 26 | 0.51 | 0.019 | 26.8 | 14 nm |
| 9 | Silver oxalate | Octacosanoic acid | 28 | Unmeasurable[6] | — | Unmeasurable[6] | |
| 10 | Silver oxalate | Triacontanoic acid | 30 | Unmeasurable[6] | — | Unmeasurable[6] | |

| | Particle size distribution[2] | | | | Electrical characteristics | |
|---|---|---|---|---|---|---|
| | Aggregation | Printability | | | Resistance | |
| No. | rating[4] | Appearance | Conduction | Evaluation[5] | (μΩcm) | Rating |
| 1 | X | X | X | X | 10 | ○ |
| 2 | X | X | X | X | 13 | ○ |
| 3 | X | X | X | X | 11 | ○ |
| 4 | ○ | ○ | ○ | ◉ | 11 | ○ |
| 5 | ○ | ○ | ○ | ◉ | 6 | ○ |
| 6 | ○ | ○ | ○ | ◉ | 18 | ○ |
| 7 | ○ | ○ | ○ | ◉ | 11 | ○ |
| 8 | ○ | ○ | ○ | ◉ | 10 | ○ |
| 9 | — | Unmeasurable[6] | — | Unmeasurable[6] | | — |
| 10 | — | Unmeasurable[6] | — | Unmeasurable[6] | | — |

[1]As amines, the same plurality of amines as in the first embodiment were applied in each case.
[2]Measurement results after 20 days from production.
[3]Average particle size of all dispersed particles by DLS.
[4]When the volume fraction of agglomerates having a particle size of 500 nm or more was 5% or less, "○" was given, while a volume fraction was more than 5%, "X" was given.
[5]The evaluation method was as follows.
◉: Entirely excellent
○: Excellent. However, defects may occur depending on the shape of metal lines.
X: Entirely defective
[6]The ink became an agar-like solid matter in several days after synthesis, and measurement/evaluation was not possible.

From Table 1, it can be seen that when the number of carbon atoms in the fatty acid is 22 or more (No. 4 to No. 8), metal lines without printing defects can be formed. In addition, in electrical conductors produced from these metal inks, increases in resistance were also within the acceptable range. Meanwhile, it was confirmed that when a $C_{18}$ or $C_{20}$ fatty acid is applied (No. 1 to No. 3), although the application can contribute to the formation of an electrical conductor having low resistance, the printability is poor. It has been already confirmed in the first embodiment (oleic acid) that a metal ink containing a low-carbon fatty acid has poor printability, and it was also confirmed from the present embodiment that the same also applies to $C_{20}$ eicosanoic acid.

Meanwhile, an ink containing a $C_{26}$ or higher high-carbon fatty acid ($C_{28}$: octacosanoic acid, $C_{30}$: triacontanoic acid) turned into an agar-like solid matter within one to several days after production. In the present embodiment, it became difficult to apply the ink for a printing use. From the above study results, it turned out that the number of carbon atoms in a fatty acid should be 22 or more and 26 or less.

In addition, in view of the relationship between the aggregation of silver particles in a metal ink and printability, when a $C_{20}$ or lower fatty acid was applied (No. 1 to No. 3), the volume fraction of coarse agglomerates having a particle size of 500 nm or more was more than 5%, and the aggregation rating was "unacceptable". It was already confirmed that a metal ink applying such a low-carbon fatty acid has poor printability, and thus relevance with the presence of coarse agglomerates is estimated.

Incidentally, with respect to silver oxalate and silver carbonate used as starting materials for silver particles, it was confirmed that the results do not differ depending on the difference in kind, and both raw materials are usable.

Third Embodiment

In this embodiment, a plurality of metal inks containing erucic acid ($C_{22}$) as a fatty acid in various amounts were produced. Then, the same test/evaluation as in the second embodiment was performed.

As in the first embodiment, silver oxalate or silver carbonate was used as a starting material to produce a metal ink. In this production step, as in the first embodiment, erucic acid was added at the timing corresponding to the kind of raw material. At this time, the amounts of erucic acid added were, based on the amount added in the second embodiment (0.131 mmol), ⅓ times (0.0436 mmol), ½ times (0.0655 mmol), 1 time (0.131 mmol), 2 times (0.262 mmol), and 3 times (0.393 mmol) the amount.

In addition, also with respect to amine compounds, as in the first embodiment, when silver oxalate was used as a raw material, N,N-dimethyl-1,3-diaminopropane, hexylamine, and dodecylamine were applied, while when silver carbonate was used as a raw material, octylamine, hexylamine, and dodecylamine were applied. The amine compounds are also added at the same timing as in the first embodiment. Then, the amounts thereof added were, based on the amount added in the first embodiment (19.98 mmol or 16.075 mmol in total), 1/5 times, 1/3 times, 1 time, 3 times, and 4 times the amount. Incidentally, the proportion of each amine compound was made common to the first embodiment.

After the addition of each protective agent, a metal ink was produced through the same steps as in the first embodiment. Then, particle size distribution, printability evaluation, and resistance measurement were performed. The results are shown in Table 2.

conductor from this metal ink has resistance that is twice or more that of the electrical conductor from the metal ink No. 14, whose erucic acid content is slightly lower than 0.06 gmmol/g. From the previous study, it has been confirmed that the application of erucic acid suppresses aggregation in a metal ink and ensures printability. From the study results, it can be said that when Ag particles are sintered at the time of electrical conductor formation, it is preferable the amount is suitably adjusted to such a degree that sintering is not inhibited.

In addition, in view of the metal ink (No. 11) in which the amount of erucic acid added was 1/3 that in the second embodiment, it was confirmed that the printability is poor in this metal ink. Erucic acid is a long-chain fatty acid having higher molecular weight than in the conventional art, and is

TABLE 2

| No. | Silver compound | Protective agent content (mmol/g) | | | | | Particle size distribution*3 |
|---|---|---|---|---|---|---|---|
| | | Amines*1 | | Fatty acid*2 | | | |
| | | Amount used in production | Content | Amount used in production | Content | Amine/ fatty acid | DLS average particle size*4 |
| 11 | Silver oxalate | 1 time | 0.95 | 1/3 times | 0.006 | 158.3 | 65 nm |
| 12 | Silver oxalate | 1 time | 0.63 | 1 time | 0.025 | 25.2 | 10 nm |
| 13 | Silver carbonate | 1 time | 1.08 | 1 time | 0.016 | 67.5 | 48 nm |
| 14 | Silver oxalate | 1 time | 0.86 | 2 times | 0.052 | 16.5 | 9 nm |
| 15 | Silver oxalate | 1 time | 0.58 | 3 times | 0.061 | 9.5 | 9 nm |
| 16 | Silver oxalate | 1/3 times | 0.31 | 2 times | 0.050 | 6.2 | 52 nm |
| 17 | Silver oxalate | 1/3 times | 0.23 | 2 times | 0.055 | 4.2 | 53 nm |
| 18 | Silver oxalate | 3 times | 1.42 | 1/2 times | 0.012 | 118.3 | 55 nm |
| 19 | Silver oxalate | 4 times | 1.68 | 1/2 times | 0.010 | 168.0 | 7 nm |

| No. | Particle size distribution*3 | Printability | | | Electrical characteristics | |
|---|---|---|---|---|---|---|
| | Aggregation rating*5 | Appearance | Conduction | Evaluation*6 | Resistance (μΩcm) | Rating |
| 11 | X | X | Δ | X | 7 | ○ |
| 12 | ○ | ○ | ○ | ⊙ | 11 | ○ |
| 13 | ○ | ○ | ○ | ⊙ | 6 | ○ |
| 14 | ○ | ○ | ○ | ⊙ | 11 | ○ |
| 15 | ○ | ○ | ○ | ⊙ | 28 | X |
| 16 | ○ | ○ | ○ | ⊙ | 12 | ○ |
| 17 | ○ | ○ | Δ | ○ | 7 | ○ |
| 18 | ○ | ○ | ○ | ⊙ | 18 | ○ |
| 19 | ○ | X | X | X | 22 | X |

*1As amines, the same plurality of amines as in the first embodiment were applied in each case. The amount of each amine used was based on the amount used in the first embodiment (1 time), and the mixing ratio of amines was the same as in the first embodiment.
*2Erucic acid ($C_{22}$) was used as a fatty acid in each case. The amount used was based on the amount used in the second embodiment (1 time)
*3Measurement results after 20 days from production.
*4Average particle size of all dispersed particles by DLS.
*5When the volume fraction of agglomerates having a particle size of 500 nm or more was 5% or less, "○" was given, while the volume fraction was more than 5%, "X" was given.
*6The evaluation method was as follows.
⊙: Entirely excellent
○: Excellent. However, defects may occur depending on the shape of metal lines.
X: Entirely defective From Table 2, in the metal ink containing erucic acid in an amount of more than 0.06 gmmol/g on a mass basis relative to silver (No. 15), when an electrical conductor was produced, the resistance rapidly increased. The electrical a compound that is originally capable of sufficiently exerting effects as a protective agent. However, it was confirmed that when the amount of erucic acid mixed is small, the protective action in the state of a metal ink is insufficient. In the case of this metal ink, the occurrence of coarse agglomerates is observed, and agglomerates having a particle size of 500 nm or more were contained in a volume fraction of 5% or more.

In view of the ratio of the content of the amine compounds to the content of the fatty acid (amine compound/fatty acid), which are protective agents, the metal ink (No. 16), in which the ratio is 6.2 that is slightly higher than 5.0, the printability was excellent, and the electrical characteristics were also excellent. In contrast, in the metal ink (No. 17) having a ratio of less than 5.0, although the electrical characteristic were excellent, with respect to printability, there were some areas where conduction cannot be locally obtained. In this respect, the line pattern of the present embodiment provides relatively thin lines (line width: 2 μm), and the conditions are severe in that even a slight lack of bonding (lack of sintering) between silver particles and the substrate leads to conduction defects. With respect to the metal ink No. 17, when its good electrical characteristics in the form of an electrical conductor are taken into consideration, presumably, depending on the conditions, the metal ink can be used as an excellent metal line precursor. However, when the formation of high-precision metal lines, which are ultrathin with a narrow pitch, is taken into consideration, it is considered to be more preferable that the ratio of the amine compound content to the fatty acid content is 5.0 or more.

INDUSTRIAL APPLICABILITY

As described above, in the metal ink according to the present invention, as a result of pursuing the configuration regarding a fatty acid serving as a protective agent, the relationship between the problem with printability and the problem with the resistance of a formed electrical conductor is optimized. The present invention is useful for the formation of electrodes/lines on circuit boards of various electronic devices or on transparent substrates of touch panels, for example, and high-precision/high-quality metal lines can be efficiently formed on these substrates.

The invention claimed is:

1. A metal ink comprising:
   metal particles including silver;
   a protective agent A including an amine compound; and
   a protective agent B including a fatty acid, wherein
   the protective agent A includes at least one $C_{4-12}$ amine compound, and the protective agent B consists of at least one $C_{22-26}$ fatty acid, but optionally contains at least one $C_{14-21}$ fatty acid,
   a content of the $C_{4-12}$ amine compound serving as the protective agent A is 0.2 mmol/g or more and 1.5 mmol/g or less on a silver particle mass basis,
   a content of the fatty acid serving as the protective agent B of is 0.01 mmol/g or more and 0.06 mmol/g or less on a silver particle mass basis, and wherein all fatty acids present in the metal ink consist of protective agent B.

2. The metal ink according to claim 1, wherein a ratio of an amine compound content to a fatty acid content is 5.0 or more and 120.0 or less.

3. The metal ink according to claim 2, wherein a proportion of coarse agglomerates having a particle size of 500 nm or more in a particle size distribution based on dynamic light scattering method is 5% or less in volume fraction.

4. The metal ink according to claim 2, wherein the silver particles have an average particle size of 5 nm or more and 100 nm or less.

5. The metal ink according to claim 2, wherein a content of the silver particles is 20 mass % or more and 70 mass % or less relative to an entire mass of the metal ink.

6. The metal ink according to claim 2, wherein when 100 μL of the metal ink is applied by spinning at a rotation speed of 2,000 rpm for 1 minute by a spin coat method and then calcined at 120° C. for 30 minutes or more, a resultant electrical conductor has a volume resistance of 5 μΩcm or more and 20 μΩcm or less.

7. The metal ink according to claim 1, wherein a proportion of coarse agglomerates having a particle size of 500 nm or more in a particle size distribution based on dynamic light scattering method is 5% or less in volume fraction.

8. The metal ink according to claim 7, wherein the silver particles have an average particle size of 5 nm or more and 100 nm or less.

9. The metal ink according to claim 7, wherein a content of the silver particles is 20 mass % or more and 70 mass % or less relative to an entire mass of the metal ink.

10. The metal ink according to claim 7, wherein when 100 μL of the metal ink is applied by spinning at a rotation speed of 2,000 rpm for 1 minute by a spin coat method and then calcined at 120° C. for 30 minutes or more, a resultant electrical conductor has a volume resistance of 5 μΩcm or more and 20 μΩcm or less.

11. The metal ink according to claim 1, wherein the silver particles have an average particle size of 5 nm or more and 100 nm or less.

12. The metal ink according to claim 11, wherein a content of the silver particles is 20 mass % or more and 70 mass % or less relative to an entire mass of the metal ink.

13. The metal ink according to claim 11, wherein when 100 μL of the metal ink is applied by spinning at a rotation speed of 2,000 rpm for 1 minute by a spin coat method and then calcined at 120° C. for 30 minutes or more, a resultant electrical conductor has a volume resistance of 5 μΩcm or more and 20 μΩcm or less.

14. The metal ink according to claim 1, wherein a content of the silver particles is 20 mass % or more and 70 mass % or less relative to an entire mass of the metal ink.

15. The metal ink according to claim 14, wherein when 100 μL of the metal ink is applied by spinning at a rotation speed of 2,000 rpm for 1 minute by a spin coat method and then calcined at 120° C. for 30 minutes or more, a resultant electrical conductor has a volume resistance of 5 μΩcm or more and 20 μΩcm or less.

16. The metal ink according to claim 1, wherein when 100 μL of the metal ink is applied by spinning at a rotation speed of 2,000 rpm for 1 minute by a spin coat method and then calcined at 120° C. for 30 minutes or more, a resultant electrical conductor has a volume resistance of 5 μΩcm or more and 20 μΩcm or less.

* * * * *